United States Patent
Blacker et al.

(10) Patent No.: US 7,597,965 B2
(45) Date of Patent: *Oct. 6, 2009

(54) COATED ARTICLE WITH LOW-E COATING HAVING ABSORBING LAYER DESIGNED TO NEUTRALIZE COLOR AT OFF-AXIS VIEWING ANGLES

(75) Inventors: Richard Blacker, Farmington Hills, MI (US); Philip J. Lingle, Temperance, MI (US); Jochen Butz, Wolfen (DE); Anton Dietrich, Fontnas (CH); Donald V. Jacobson, Saline, MI (US)

(73) Assignees: Guardian Industries Corp., Auburn Hills, MI (US); Centre Luxembourgeois de Recherches pour le Verre et la Ceramique S.A. (C.R.V.C.), Grand Duche de Luxembourg (LU)

( * ) Notice: Subject to any disclaimer, the term of this patent is extended or adjusted under 35 U.S.C. 154(b) by 402 days.

This patent is subject to a terminal disclaimer.

(21) Appl. No.: 11/522,512

(22) Filed: Sep. 18, 2006

(65) Prior Publication Data

US 2008/0070044 A1 Mar. 20, 2008

(51) Int. Cl.
*B32B 17/06* (2006.01)

(52) U.S. Cl. ............... 428/432; 428/698; 428/469; 428/701; 428/702

(58) Field of Classification Search ................ None
See application file for complete search history.

(56) References Cited

U.S. PATENT DOCUMENTS

| | | | |
|---|---|---|---|
| 6,576,349 B2 | 6/2003 | Lingle et al. | |
| 7,081,302 B2 | 7/2006 | Lemmer et al. | |
| 7,294,402 B2 * | 11/2007 | Laird et al. | 428/428 |
| 2003/0049464 A1 | 3/2003 | Glenn et al. | |
| 2003/0150711 A1 | 8/2003 | Laird | |
| 2004/0005467 A1 | 1/2004 | Neuman et al. | |
| 2005/0123772 A1 | 6/2005 | Coustet et al. | |
| 2005/0196622 A1 | 9/2005 | Laird et al. | |
| 2005/0202254 A1 | 9/2005 | Nunez-Regueiro et al. | |
| 2005/0202255 A1 | 9/2005 | Lemmer et al. | |
| 2006/0046074 A1 | 3/2006 | Ferreira et al. | |

FOREIGN PATENT DOCUMENTS

EP 1 630 142 3/2006

* cited by examiner

*Primary Examiner*—Ling Xu
(74) *Attorney, Agent, or Firm*—Nixon & Vanderhye P.C.

(57) ABSTRACT

An absorbing layer of a low-E coating is designed to cause the coating to have a more neutral and/or green color at normal and/or certain off-axis viewing angles. In certain example embodiments, the metallic or substantially metallic absorbing layer (e.g., NiCr) is from about 20-30 angstroms (Å) thick; this thickness has been found to unexpectedly provide less red and more neutral coloration for the coated article at certain off-axis viewing angles (e.g., at a 45 degree off-axis viewing angle). In certain example embodiments, the absorbing layer is provided between first and second nitride layers in order to reduce or prevent oxidation thereof during heat treatment thereby permitting predictable coloration to be achieved following the heat treatment. Coated articles according to certain example embodiments of this invention may be used in the context of insulating glass (IG) window units, vehicle windows, other types of windows, or in any other suitable application.

22 Claims, 2 Drawing Sheets

COATED ARTICLE WITH LOW-E COATING HAVING ABSORBING LAYER DESIGNED TO NEUTRALIZE COLOR AT OFF-AXIS VIEWING ANGLES

This invention relates to a coated article including a low-E coating. In certain example embodiments, an absorbing layer of the low-E coating is designed to cause the coating to have a more neutral and/or green color at normal and/or certain off-axis viewing angles. In certain example embodiments, the absorbing layer is metallic, or substantially metallic, and is provided between first and second nitride layers (e.g., silicon nitride based layers) in order to reduce or prevent oxidation thereof during heat treatment (e.g., thermal tempering, heat bending, and/or heat strengthening) thereby permitting predictable coloration to be achieved following the heat treatment. Moreover, in certain example embodiments, an interlayer comprising tin oxide or the like may optionally be provided under an upper infrared (IR) reflecting layer and in particular between respective layers comprising silicon nitride and zinc oxide. Coated articles according to certain example embodiments of this invention may be used in the context of insulating glass (IG) window units, vehicle windows, other types of windows, or in any other suitable application.

BACKGROUND OF THE INVENTION

Coated articles are known in the art for use in window applications such as insulating glass (IG) window units, vehicle windows, and/or the like. It is known that in certain instances, it is desirable to heat treat (e.g., thermally temper, heat bend and/or heat strengthen) such coated articles for purposes of tempering, bending, or the like in certain example instances.

In certain situations, designers of coated articles often strive for a combination of desirable visible transmission, substantially neutral color, low emissivity (or emittance), and low sheet resistance ($R_s$). High visible transmission for example may permit coated articles to be more desirable in certain window applications, whereas low-emissivity (low-E) and low sheet resistance characteristics permit such coated articles to block significant amounts of IR radiation so as to reduce for example undesirable heating of vehicle or building interiors. However, heat treatment of coated articles typically requires use of temperature(s) of at least 580 degrees C., more preferably of at least about 600 degrees C. and still more preferably of at least 620 degrees C. The use of such high temperatures (e.g., for 5-10 minutes or more) often causes coatings to break down, have undesirable off-axis color values, and/or causes one or more of the aforesaid desirable characteristics to significantly deteriorate in an undesirable manner.

U.S. Patent Document 2005/0202254, commonly owned and hereby incorporated herein by reference, discloses a coated article having the following layers on a glass substrate, from the glass substrate outwardly.

| Layer Glass Substrate |
| --- |
| $TiO_2$ |
| $Si_3N_4$ |
| ZnO |
| Ag |
| $NiCrO_x$ |
| $SnO_2$ |
| $Si_3N_4$ |
| $SnO_2$ |
| ZnO |
| Ag |
| $NiCrO_x$ |
| $SnO_2$ |
| $Si_3N_4$ |

While the aforesaid coated article is heat treatable, and has many desirable and good characteristics, it does have problems with reddish off-axis coloration at high off-axis viewing angles. E.g., see the Comparative Example discussed below.

U.S. Patent Document 2005/0196622 discloses a coated article including a layer stack of silicon nitride, NiCr, silicon nitride, etc. in a bottom portion of the coating. However, 2005/0196622 does not recognize any particular thickness of the NiCr layer as being desirable, and also does not disclose or suggest that the NiCr layer has any bearing on off-axis coloration. Instead, 2005/0196622 teaches the opposite of this invention because 2005/0196622 states that variation in thickness of the NiCr layer does not significantly affect glass side reflective a* coloration.

In view of the above, it will be apparent to those skilled in the art that there exists a need in the art for a coated article with more desirable (e.g., less red and/or more green) off axis coloration.

BRIEF SUMMARY OF EXAMPLE EMBODIMENTS OF THE INVENTION

A coated article including a low-E coating. In certain example embodiments, an absorbing layer of the low-E coating is designed to cause the coating to have a more neutral and/or green color at normal and/or certain off-axis viewing angles. In certain example embodiments, the metallic or substantially metallic absorbing layer (e.g., NiCr) is from about 20-30 angstroms (Å) thick. Unexpectedly, this thickness for the absorbing layer has surprisingly been found to provide less red and more neutral coloration for the coated article at certain off-axis viewing angles (e.g., at a 45 degree off-axis viewing angle). In other words, the approximate 20-30 Å thickness of the absorbing layer has been unexpectedly found to provide for less red, more green, and thus more desirable off-axis glass side reflective coloration of the coated article. Accordingly, the coated article does not appear red in color when viewed at off-axis viewing angles (e.g., at a 45 degree viewing angle), which is highly advantageous from an aesthetic perspective.

In certain example embodiments, the metallic or substantially metallic absorbing layer is provided between first and second nitride layers (e.g., silicon nitride based layers) in order to reduce or prevent oxidation thereof during heat treatment (e.g., thermal tempering, heat bending, and/or heat strengthening) thereby permitting predictable coloration to be achieved following the heat treatment. Coated articles according to certain example embodiments of this invention may be used in the context of insulating glass (IG) window units, vehicle windows, other types of windows, or in any other suitable application.

Moreover, in certain example embodiments, an interlayer comprising tin oxide or the like may optionally be provided under an upper infrared (IR) reflecting layer and in particular between respective layers comprising silicon nitride and zinc oxide. Unexpectedly, it has been found that the use of such a tin oxide inclusive interlayer (or adhesion layer) results in significantly improved thermal stability, mechanical durability (e.g., scratch resistance), and haze characteristics. For example, with regard to thermal stability, it has been found that the use of such a tin oxide inclusive interlayer results in a coated article which is capable of realizing one or more of: (a) less visible transmission shift due to heat treatment, (b) higher visible transmission following heat treatment; (c) less shifting of certain color value(s) due to heat treatment, (d) substantially neutral coloration following heat treatment; (e) more stable, or even decreasing, sheet resistance due to heat treatment, (f) lower sheet resistance and thus lower emissivity following heat treatment, and/or (g) improved haze characteristics following heat treatment. It has also been found that the provision of this tin oxide inclusive interlayer is also capable of significantly improving mechanical durability and haze characteristics of the coated article, compared to if the layer were not present. These surprisingly results, which in certain example instances are associated with the use of the combination layer stack portion of glass . . . . $Si_xN_y/SnO_2/ZnO/Ag$ . . . , are highly advantageous, since mechanical durability, higher visible transmission, lower emissivity, lower sheet resistance, reduced haze, and/or improved thermal stability are typically desired features in coated articles.

In certain example embodiments of this invention, there is provided a coated article including a coating supported by a glass substrate, the coating comprising: first and second infrared (IR) reflecting layers comprising silver, wherein said IR reflecting layers are spaced apart from one another by at least one dielectric layer that is located therebetween, and wherein the first IR reflecting layer is located closer to the substrate than is the second IR reflecting layer; a substantially metallic absorption layer consisting essentially of NiCr located such that both of the first and second IR reflecting layers are located over the absorption layer, wherein the absorption layer is sandwiched between and contacting first and second layers comprising silicon nitride; and wherein the substantially metallic absorption layer is from about 20-30 angstroms (Å) thick and the coated article has a glass side reflective a* color value of from about +1 to −1.5 at a 45 degree viewing angle from normal.

In other example embodiments of this invention, there is provided a coated article including a coating supported by a glass substrate, the coating comprising: first and second infrared (IR) reflecting layers comprising silver, wherein said IR reflecting layers are spaced apart from one another by at least one dielectric layer that is located therebetween, and wherein the first IR reflecting layer is located closer to the substrate than is the second IR reflecting layer; a substantially metallic absorption layer located such that both of the first and second IR reflecting layers are located over the absorption layer, wherein the absorption layer is sandwiched between and contacting first and second nitride inclusive layers; and wherein the substantially metallic absorption layer is from about 20-30 angstroms (Å) thick.

In still further example embodiments of this invention, there is provided a coated article including a coating supported by a glass substrate, the coating comprising: first and second infrared (IR) reflecting layers comprising silver, wherein said IR reflecting layers are spaced apart from one another by at least one dielectric layer that is located therebetween, and wherein the first IR reflecting layer is located closer to the substrate than is the second IR reflecting layer; a substantially metallic absorption layer located such that both of the first and second IR reflecting layers are located over the absorption layer, wherein the absorption layer is sandwiched between and contacting first and second nitride inclusive layers; and wherein the coated article has a glass side reflective a* color value of from about +1 to −1.5 at a 45 degree viewing angle from normal.

In other example embodiments, there is provided a coated article including a coating supported by a glass substrate, the coating comprising: first and second infrared (IR) reflecting layers comprising silver, wherein said IR reflecting layers are spaced apart from one another by at least one dielectric layer that is located therebetween, and wherein the first IR reflecting layer is located closer to the substrate than is the second IR reflecting layer; an absorption layer located such that both of the first and second IR reflecting layers are located over the absorption layer, wherein the absorption layer is sandwiched between and contacting first and second nitride inclusive layers; and wherein the coated article is characterized by one or both of: (a) the absorption layer is from about 20-30 angstroms (Å) thick, and/or (b) the coated article has a glass side reflective a* color value of from about +1 to −1.5 at a 45 degree viewing angle from normal. The absorption/absorbing layer may be metallic, a metal nitride, or the like, in certain example embodiments of this invention.

DETAILED DESCRIPTION OF EXAMPLE EMBODIMENTS OF THE INVENTION

Coated articles herein may be used in applications such as IG window units, vehicle windows, monolithic architectural windows, residential windows, and/or any other suitable application that includes single or multiple glass substrates.

In certain example embodiments of this invention, the coating includes a double-silver stack, although this invention is not so limited in all instances.

For example, in certain example embodiments of this invention, heat treated coated articles having multiple IR reflecting layers (e.g., two spaced apart silver based layers) are capable of realizing a sheet resistance ($R_s$) of less than or equal to 3.0 (more preferably less than or equal to 2.5, even more preferably less than or equal to 2.1, and most preferably less than or equal to 2.0). In certain example embodiments, following heat treatment and as measured in monolithic form, coated articles herein are capable of realizing a visible transmission (Ill. C, 2 degree) of at least about 40%, more preferably of at least about 50%. Moreover, in certain example embodiments, following heat treatment and coupling to another glass substrate to form an IG window unit, IG window unit coated articles according to certain example embodiments of this invention are capable of realizing a visible transmission of at least about 40%, more preferably of at least about 50%.

The terms "heat treatment" and "heat treating" as used herein mean heating the article to a temperature sufficient to achieve thermal tempering, heat bending, and/or heat strengthening of the glass inclusive article. This definition includes, for example, heating a coated article in an oven or furnace at a temperature of at least about 580 degrees C., more preferably at least about 600 degrees C., for a sufficient period to allow tempering, bending, and/or heat strengthening. In certain instances, the HT may be for at least about 4 or 5 minutes. The coated article may or may not be heat treated in different embodiments of this invention.

Figure 1:
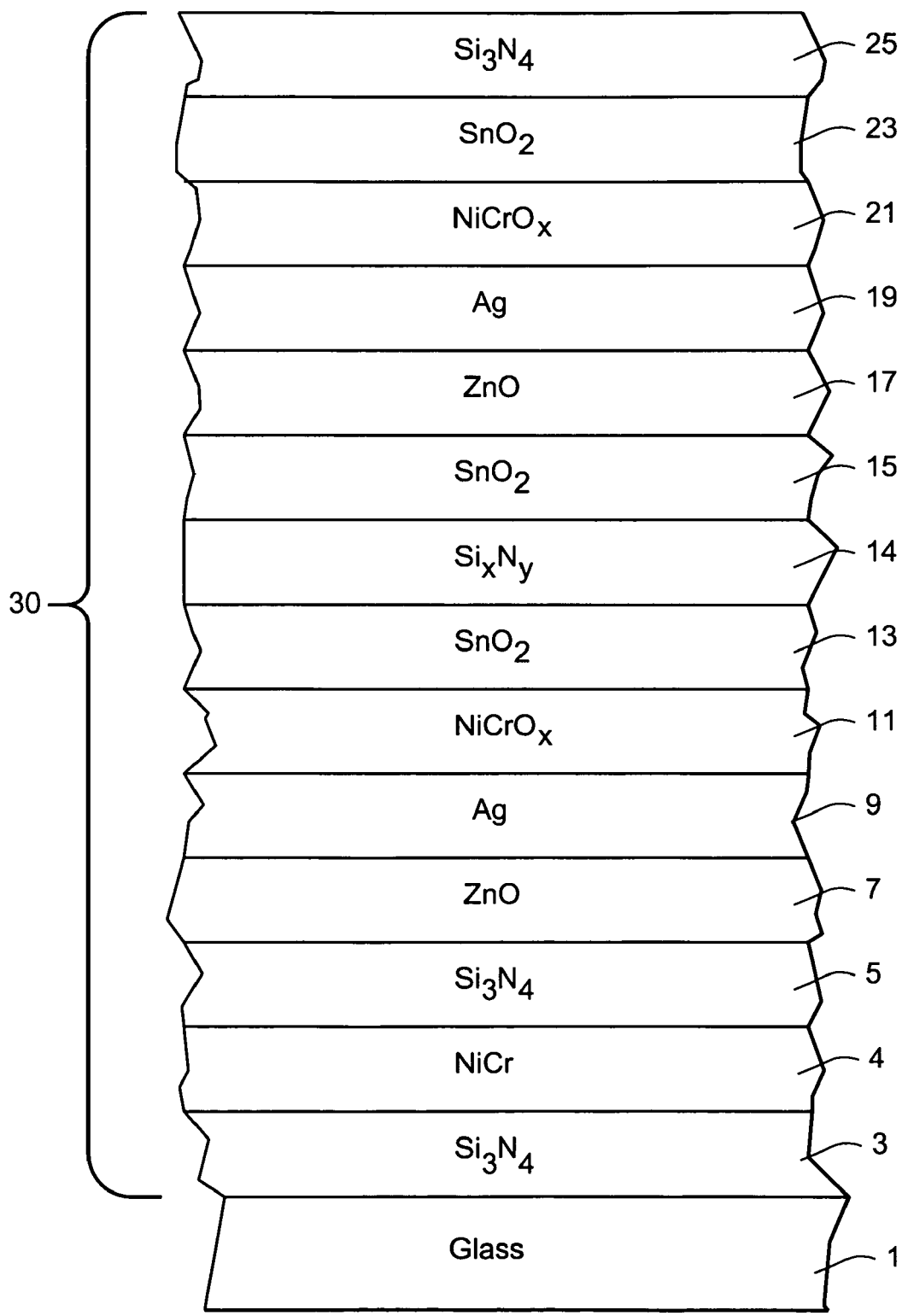
FIG. 1 is a cross sectional view of a coated article according to an example embodiment of this invention.

FIG. 1 is a side cross sectional view of a coated article according to an example non-limiting embodiment of this invention. The coated article includes substrate 1 (e.g., clear, green, bronze, or blue-green glass substrate from about 1.0 to 10.0 mm thick, more preferably from about 1.0 mm to 3.5 mm thick), and low-E coating (or layer system) 30 provided on the substrate 1 either directly or indirectly. The coating (or layer system) 30 includes, for example: bottom dielectric silicon nitride layer 3 which may be $Si_3N_4$, of the Si-rich type for haze reduction, or of any other suitable stoichiometry silicon nitride in different embodiments of this invention, metallic or substantially metallic absorbing layer 4 (e.g., of or including NiCr or the like), additional dielectric silicon nitride layer 5 which may be $Si_3N_4$, of the Si-rich type for haze reduction, or of any other suitable stoichiometry silicon nitride, first lower contact layer 7 (which contacts bottom IR reflecting layer 9), first conductive and preferably metallic infrared (IR) reflecting layer 9, first upper contact layer 11 (which contacts layer 9), dielectric layer 13 (which may be deposited in one or multiple steps in different embodiments of this invention), another silicon nitride based and/or inclusive layer 14, tin oxide inclusive based and/or inclusive interlayer 15, second lower contact layer 17 (which contacts IR reflecting layer 19), second conductive and preferably metallic IR reflecting layer 19, second upper contact layer 21 (which contacts layer 19), dielectric layer 23, and finally protective dielectric layer 25. The "contact" layers 7, 11, 17 and 21 each contact at least one IR reflecting layer (e.g., layer based on Ag). The aforesaid layers 3-25 make up low-E (i.e., low emissivity) coating 30 that is provided on glass or plastic substrate 1.

In monolithic instances, the coated article includes only one glass substrate 1 as illustrated in FIG. 1. However, monolithic coated articles herein may be used in devices such as laminated vehicle windshields, IG window units, and the like. As for IG window units, an IG window unit may include two spaced apart glass substrates. An example IG window unit is illustrated and described, for example, in U.S. Patent Document No. 2004/0005467, the disclosure of which is hereby incorporated herein by reference. An example IG window unit may include, for example, the coated glass substrate 1 shown in FIG. 1 coupled to another glass substrate via spacer(s), sealant(s) or the like, with a gap being defined therebetween. This gap between the substrates in IG unit embodiments may in certain instances be filled with a gas such as argon (Ar). An example IG unit may comprise a pair of spaced apart clear glass substrates each about 3-4 mm thick, one of which is coated with a coating 30 herein in certain example instances, where the gap between the substrates may be from about 5 to 30 mm, more preferably from about 10 to 20 mm, and most preferably about 16 mm. In certain example instances, the coating 30 may be provided on the interior surface of either substrate facing the gap.

Absorption layer 4 is, in certain example embodiments of this invention, located between and contacting dielectric layers 3 and 5. In certain example embodiments, each of layers 3 and 5 surrounding the absorption layer 4 is a nitride layer and is substantially or entirely non-oxidized. This is advantageous in that it helps prevent (or reduce the likelihood of) the absorption layer from being oxidized during heat treatment, thereby better allowing the absorption layer to perform one of its intended functions, in particular absorbing at least some amount (e.g., at least 5%, more preferably at least 10%) of visible light. It will be appreciated that if a layer becomes too oxidized during heat treatment or the like, it no longer can function as an adequate absorption layer.

In certain example embodiments of this invention, absorption layer 4 may be of or include NiCr (any suitable ratio or Ni:Cr). In certain example embodiments, it is desired that the absorption layer 4 comprises from 0-10% oxygen, more preferably from 0-5% oxygen, and most preferably from 0-2% oxygen (atomic %). While NiCr is a preferred material for the absorption layer 4, it is possible that other materials may instead be used. For example, in certain other example embodiments of this invention, the absorption layer 4 may be of or include Ni, Cr, $NiCrN_x$, CrN, ZrN, or TiN. In non-heat treatable embodiments, any of the aforesaid materials may be used for the absorption/absorbing layer 4, as well as other materials such as Ti, Zr, NiOx or the like.

Figure 2:
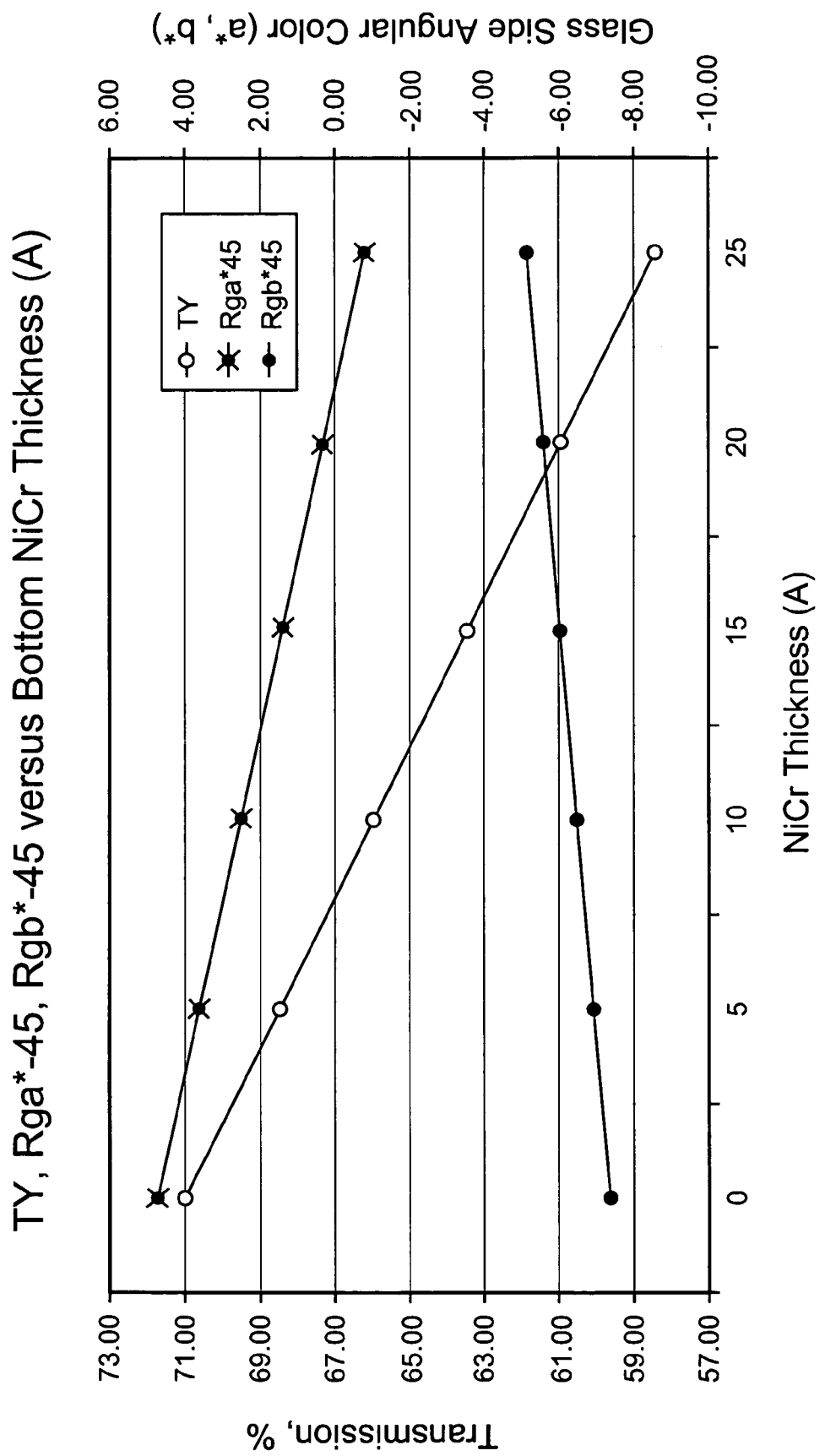
FIG. 2 is a graph illustrating off-axis color advantages of certain thicknesses of an example NiCr absorbing layer according to certain example embodiments of this invention.

The absorbing layer 4 of the low-E coating is designed to cause the coating to have a more neutral and/or green color at normal and/or certain off-axis viewing angles. In certain example embodiments, the metallic or substantially metallic absorbing layer (e.g., NiCr) 4 is from about 20-30 angstroms (Å) thick; Unexpectedly, as shown in FIG. 2, this thickness for the absorbing layer 4 has surprisingly been found to provide less red and more neutral coloration for the coated article at certain off-axis viewing angles (e.g., at a 45 degree off-axis viewing angle). In other words, the approximate 20-30 Å thickness of the absorbing layer 4 has been unexpectedly found to provide for less red, more green, and thus more desirable off-axis glass side reflective coloration of the coated article. Accordingly, the coated article does not appear red in color when viewed at off-axis viewing angles (e.g., at a 45 degree viewing angle), which is highly advantageous from an aesthetic perspective.

FIG. 2 illustrates the unexpected results associated with the 20-30 Å thickness range of the absorbing layer 4 in connection with the low-E coating of FIG. 1. As shown in FIG. 2, if no absorbing layer 4 is provided (zero NiCr thickness), the coated article has an undesirable, very red, 5.0 glass side reflective a* value at a viewing angle 45 degrees off-axis, or 45 degrees from normal (Rga* 45). In other words, if no absorbing-layer 4 is provided, the coated article appears too red when viewed at a 45 degree angle on the glass side reflective side. Moreover, if the NiCr absorbing layer 4 is only 5 or 10 Å thick, then the coated article still has a fairly red glass side reflective a* value of about 3.5 or 2.7 at the 45 degree viewing angle. Accordingly, it will be appreciated from FIG. 2, that NiCr layer 4 thicknesses below about 18 Å cause undesirably red coloration at the 45 degree viewing angle. However, as shown in FIG. 2, when the thickness of the NiCr absorbing layer 4 is from about 20-30 Å thick, the glass side reflective a* value is a more desirable less red and/or more green. In particular, when the thickness of the NiCr absorbing layer 4 is from about 20-30 Å thick, the glass side reflective a* value at the 45 degree viewing angle is in a more desirable range of from about +1 to −1.5, more preferably from about +0.5 to −1.0, and most preferably from about 0 to −1.0 or −0.6. Moreover, if the NiCr absorbing layer is substantially thicker than this range, the visible transmission of the coated article becomes undesirably low and the off-axis color can become too green. Thus, it will be appreciated that FIG. 2 illustrates the unexpected off-axis glass side reflective a* results associated with the 20-30 Å preferred thickness range for the absorbing layer 4. While glass side reflective a* values of from about +1 to −1.5 at the 45 degree viewing angle are desired in certain example instances, any negative glass side reflective a* value is acceptable at the 45 degree angle viewing angle in certain instances which means that the color is not red (the highly positive glass side reflective a* values are undesired because they cause undesirable red color).

Additionally, FIG. 2 illustrates unexpected b* color results associated with the 20-30 Å thickness range of the absorbing layer 4. As shown in FIG. 2, if no absorbing layer 4 is provided (zero NiCr thickness), the coated article has an undesirable very negative glass side reflective b* value of −7.5 at a viewing angle 45 degrees off-axis, or 45 degrees from normal (Rgb* 45). However, as shown in FIG. 2, when the thickness of the NiCr absorbing layer 4 is from about 20-30 Å thick, the glass side reflective b* value is a more desirable less negative value of from about 0 to −6.0, more preferably from about −4 to −6, at the 45 degree viewing angle.

In certain example embodiments, the metallic or substantially metallic absorbing layer 4 is provided between first and second nitride layers (e.g., silicon nitride based layers) 3 and 5 in order to reduce or prevent oxidation thereof during heat treatment (e.g., thermal tempering, heat bending, and/or heat strengthening) thereby permitting predictable coloration to be achieved following the heat treatment.

Moreover, in certain example embodiments, an interlayer 15 comprising tin oxide or the like may be provided under an upper infrared (IR) reflecting layer 19 and in particular between respective layers comprising silicon nitride 14 and zinc oxide 17. Unexpectedly, it has been found that the use of such a tin oxide inclusive interlayer (or adhesion layer) 15 results in significantly improved thermal stability, mechanical durability (e.g., scratch resistance), and haze characteristics. For example, with regard to thermal stability, it has been found that the use of such a tin oxide inclusive interlayer 15 results in a coated article which is capable of realizing one or more of: (a) less visible transmission shift due to heat treatment, (b) higher visible transmission following heat treatment; (c) less shifting of certain color value(s) due to heat treatment, (d) substantially neutral coloration following heat treatment; (e) more stable, or even decreasing, sheet resistance due to heat treatment, (f) lower sheet resistance and thus lower emissivity following heat treatment, and/or (g) improved haze characteristics following heat treatment. It has also been found that the provision of this tin oxide inclusive interlayer 15 is also capable of significantly improving mechanical durability and haze characteristics of the coated article, compared to if the layer were not present. These surprisingly results, which in certain example instances are associated with the use of the combination layer stack portion of glass . . . . $Si_xN_y$/$SnO_2$/ZnO/Ag . . . , are highly advantageous, since mechanical durability, higher visible transmission, lower emissivity, lower sheet resistance, reduced haze, and/or improved thermal stability are typically desired features in coated articles.

Dielectric layers 3, 5 and 14 may be of or include silicon nitride in certain embodiments of this invention. Silicon nitride layers 3, 5 and 14 may, among other things, improve heat-treatability of the coated articles, e.g., such as thermal tempering or the like. The silicon nitride of layers 3, 5 and/or 14 may be of the stoichiometric type (i.e., $Si_3N_4$), or alternatively of the Si-rich type in different embodiments of this invention. For example, Si-rich silicon nitride 3 (and/or 5, 14) combined with zinc oxide and/or tin oxide under a silver based IR reflecting layer may permit the silver to be deposited (e.g., via sputtering or the like) in a manner which causes its sheet resistance to be lessened compared to if certain other material(s) were under the silver. Moreover, the presence of free Si in a Si-rich silicon nitride inclusive layer 3 (5 and/or 14) may allow certain atoms such as sodium (Na) which migrate outwardly from the glass 1 during HT to be more efficiently stopped by the Si-rich silicon nitride inclusive layer before they can reach the silver and damage the same. Thus, it is believed that the Si-rich $Si_xN_y$ can reduce the amount of damage done to the silver layer(s) during HT in certain example embodiments of this invention thereby allowing sheet resistance ($R_s$) to decrease or remain about the same in a satisfactory manner. Moreover, it is believed that the Si-rich $Si_xN_y$ in layer 3 and/or 5 can reduce the amount of damage (e.g., oxidation) done to absorbing layer 4 during HT in certain example optional embodiments of this invention.

In certain example embodiments, when Si-rich silicon nitride us used in layer 3, 5 and/or 14, the Si-rich silicon nitride layer as deposited may be characterized by $Si_xN_y$ layer(s), where x/y may be from 0.76 to 1.5, more preferably from 0.8 to 1.4, still more preferably from 0.85 to 1.2. Moreover, in certain example embodiments, before and/or after HT the Si-rich $Si_xN_y$ layer(s) may have an index of refraction "n" of at least 2.05, more preferably of at least 2.07, and sometimes at least 2.10 (e.g., 632 nm) (note: stoichiometric $Si_3N_4$ which may also be used has an index "n" of 2.02-2.04). In certain example embodiments, it has surprisingly been found that improved thermal stability is especially realizable when the Si-rich $Si_xN_y$ layer(s) as deposited has an index of refraction "n" of at least 2.10, more preferably of at least 2.20, and most preferably from 2.2 to 2.4. Also, the Si-rich $Si_xN_y$ layer in certain example embodiments may have an extinction coefficient "k" of at least 0.001, more preferably of at least 0.003 (note: stoichiometric $Si_3N_4$ has an extinction coefficient "k" of effectively 0). Again, in certain example embodiments, it has surprisingly been found that improved thermal stability can be realized when "k" for the Si-rich $Si_xN_y$ layer(s) is from 0.001 to 0.05 as deposited (550 nm). It is noted that n and k tend to drop due to heat treatment.

Any and/or all of the silicon nitride layers discussed herein may be doped with other materials such as stainless steel or aluminum in certain example embodiments of this invention. For example, any and/or all silicon nitride layers discussed herein may optionally include from about 0-15% aluminum, more preferably from about 1 to 10% aluminum, in certain example embodiments of this invention. The silicon nitride may be deposited by sputtering a target of Si or SiAl in certain embodiments of this invention. Oxygen may also be provided in certain instances in the silicon nitride layers.

Infrared (IR) reflecting layers 9 and 19 are preferably substantially or entirely metallic and/or conductive, and may comprise or consist essentially of silver (Ag), gold, or any other suitable IR reflecting material. IR reflecting layers 9 and 19 help allow the coating to have low-E and/or good solar control characteristics. The IR reflecting layers may, however, be slightly oxidized in certain embodiments of this invention.

The upper contact layers 11 and 21 may be of or include nickel (Ni) oxide, chromium/chrome (Cr) oxide, or a nickel alloy oxide such as nickel chrome oxide ($NiCrO_x$), or other suitable material(s), in certain example embodiments of this invention. The use of, for example, $NiCrO_x$ in these layers (11 and/or 21) allows durability to be improved. The $NiCrO_x$ of layers 11 and/or 21 may be fully oxidized in certain embodiments of this invention (i.e., fully stoichiometric), or alternatively may only be partially oxidized. In certain instances, the $NiCrO_x$ layers 11 and/or 21 may be at least about 50% oxidized. Contact layers 11 and/or 21 (e.g., of or including an oxide of Ni and/or Cr) may or may not be oxidation graded in different embodiments of this invention. Oxidation grading means that the degree of oxidation in the layer changes throughout the thickness of the layer so that for example a contact layer may be graded so as to be less oxidized at the contact interface with the immediately adjacent IR reflecting layer than at a portion of the contact layer(s) further or more/most distant from the immediately adjacent IR reflecting layer. Descriptions of various types of oxidation graded contact layers are set forth in U.S. Pat. No. 6,576,349, the disclosure of which is hereby incorporated herein by reference. Contact layers 11 and/or 21 (e.g., of or including an oxide of Ni and/or Cr) may or may not be continuous in different embodiments of this invention across the entire IR reflecting layer.

Dielectric layer 13 may be of or include tin oxide in certain example embodiments of this invention. However, as with other layers herein, other materials may be used in different instances.

Lower contact layers 7 and/or 17 in certain embodiments of this invention are of or include zinc oxide (e.g., ZnO). The zinc oxide of layers 7 and 17 may contain other materials as well such as Al (e.g., to form $ZnAlO_x$). For example, in certain example embodiments of this invention, one or more of zinc oxide layers 7, 17 may be doped with from about 1 to 10% Al, more preferably from about 1 to 5% Al, and most preferably about 1 to 4% Al.

Interlayer 15 of or including tin oxide is provided under IR reflecting layer 19 so as to be located between silicon nitride layer 14 and zinc oxide layer 17. Surprisingly, as explained above, it has been found that the use of such a tin oxide inclusive interlayer 15 results in numerous improvements compared to a situation where the layer is not provided. For example, it has been found that the use of such a tin oxide inclusive interlayer 15 results in a coated article which is capable of realizing: (a) less visible transmission shift due to heat treatment, (b) higher visible transmission following heat treatment; (c) less shifting of certain color value(s) due to heat treatment, (d) substantially neutral coloration following heat treatment; (e) more stable, or even decreasing, sheet resistance due to heat treatment, (f) lower sheet resistance and thus lower emissivity following heat treatment, (g) improved haze characteristics following heat treatment, and/or (h) improved mechanical durability such as scratch resistance before and/or after heat treatment. Thus, in certain example embodiments of this invention, coated articles may be taken to higher temperatures during heat treatment and/or for longer times without suffering undesirable significant transmission drops and/or increases in sheet resistance. In certain alternative embodiments, it is possible to dope the tin oxide of layer 15 with other materials such as Al, Zn or the like. Alternatively, other metal oxide(s) may be used for layer 15 in certain instances.

Dielectric layer 23 may be of or include tin oxide in certain example embodiments of this invention. However, layer 23 is optional and need not be provided in certain example embodiments of this invention. Dielectric layer 25, which may be an overcoat in certain example instances, may be of or include silicon nitride (e.g., $Si_3N_4$) or any other suitable material in certain example embodiments of this invention. Optionally, other layers may be provided above layer 25. Layer 25 is provided for durability purposes, and to protect the underlying layers during heat treatment and/or environmental use. In certain example embodiments, layer 25 may have an index of refraction (n) of from about 1.9 to 2.2, more preferably from about 1.95 to 2.05.

Other layer(s) below or above the illustrated coating may also be provided. Thus, while the layer system or coating is "on" or "supported by" substrate 1 (directly or indirectly), other layer(s) may be provided therebetween. Thus, for example, the coating of FIG. 1 may be considered "on" and "supported by" the substrate 1 even if other layer(s) are provided between layer 3 and substrate 1. Moreover, certain layers of the illustrated coating may be removed in certain embodiments, while others may be added between the various layers or the various layer(s) may be split with other layer(s) added between the split sections in other embodiments of this invention without departing from the overall spirit of certain embodiments of this invention.

While various thicknesses and materials may be used in layers in different embodiments of this invention, example thicknesses and materials for the respective layers on the glass substrate 1 in the FIG. 1 embodiment are as follows, from the glass substrate outwardly:

Example Materials/Thicknesses; FIG. 1 Embodiment

| Layer<br>Glass (1-10 mm thick) | Preferred<br>Range (Å) | More<br>Preferred (Å) | Example (Å) |
|---|---|---|---|
| $Si_xN_y$ (layer 3) | 40-250 Å | 50-200 Å | 124 Å |
| NiCr (layer 4) | 15-40 Å | 20-30 Å | 25 Å |
| $Si_xN_y$ (layer 5) | 40-450 Å | 70-300 Å | 200 Å |
| $ZnO_x$ (layer 7) | 10-300 Å | 40-150 Å | 110 Å |
| Ag (layer 9) | 50-250 Å | 80-120 Å | 119 Å |
| $NiCrO_x$ (layer 11) | 10-100 Å | 12-40 Å | 30 Å |
| $SnO_2$ (layer 13) | 0-1,000 Å | 200-700 Å | 442 Å |
| $Si_xN_y$ (layer 14) | 50-450 Å | 80-200 Å | 125 Å |
| $SnO_2$ (layer 15) | 30-250 Å | 50-200 Å | 100 Å |
| $ZnO_x$ (layer 17) | 10-300 Å | 40-150 Å | 100 Å |
| Ag (layer 19) | 50-250 Å | 80-220 Å | 155 Å |
| $NiCrO_x$ (layer 21) | 10-100 Å | 20-45 Å | 30 Å |
| $SnO_2$ (layer 23) | 0-750 Å | 40-200 Å | 70 Å |
| $Si_3N_4$ (layer 25) | 0-750 Å | 80-320 Å | 302 Å |

In certain example embodiments of this invention, coated articles herein may have the following optical and solar characteristics set forth in Table 2 when measured monolithically (before any optional HT). The sheet resistances ($R_s$) herein take into account all IR reflecting layers (e.g., silver layers 9, 19).

Optical/Solar Characteristics (Monolithic; Pre-HT)

| Characteristic | General | More Preferred | Most Preferred |
|---|---|---|---|
| $R_s$ (ohms/sq.): | <=5.0 | <=4.0 | <=3.0 |
| $E_n$: | <=0.07 | <=0.04 | <=0.03 |
| $T_{vis}$ (Ill. C. 2°): | >=40% | >=45% | >=50% |

In certain example embodiments, coated articles herein may have the following characteristics, measured monolithically for example, after heat treatment (HT):

Optical/Solar Characteristics (Monolithic; Post-HT)

| Characteristic | General | More Preferred | Most Preferred |
|---|---|---|---|
| $R_s$ (ohms/sq.): | <=3.0 | <=2.5 | <=2.1 (or <=2.0) |
| $E_n$: | <=0.07 | <=0.04 | <=0.03 |
| $T_{vis}$ (Ill. C. 2°): | >=40% | >=45% | >=50% |
| Transmitted Haze: | <=0.6 | <=0.5 | <=0.4 |

Moreover, in certain example laminated embodiments of this invention, coated articles herein which have been optionally heat treated to an extent sufficient for tempering, and which have been coupled to another glass substrate to form an IG unit, may have the following IG unit optical/solar characteristics.

Example Optical Features (IG Unit or Monolithic Pre or Post-HT)

| Characteristic | General | More Preferred |
|---|---|---|
| $T_{vis}$ (or TY)(Ill. C. 2°): | >=40% | >=50% |
| $a^*_t$ (Ill. C. 2°): | −6 to +1.0 | −5 to 0.0 |
| $b^*_t$ (Ill. C. 2°): | −2.0 to +8.0 | 0.0 to 7.0 |
| $L^*$ (Ill. C. 2°): | 80-95 | 84-95 |
| $R_fY$ (Ill. C., 2 deg.): | 1 to 13% | 1 to 12% |
| $a^*_f$ (Ill. C., 2°): | −15.0 to +2.0 | −14.0 to +0.5 |
| $b^*_f$ (Ill. C., 2°): | −10.0 to +10.0 | −6.0 to +3.5 |
| $L^*$ (Ill. C. 2°): | 30-45 | 33-41 |
| $R_gY$ (Ill. C., 2 deg.): | 1 to 14% | 1 to 13% |
| $a^*_g$ (Ill. C., 2°): | −3.0 to +2.0 | −2.0 to +1.5 |
| $b^*_g$ (Ill. C., 2°): | −10.0 to +10.0 | −5.0 to 0 |
| $L^*$ (Ill. C. 2°): | 30-40 | 33-38 |
| SHGC (surface 2): | <=0.42 | <=0.38 |
| SHGC (surface 3): | <=0.47 | <=0.45 |

The following examples are provided for purposes of example only, and are not intended to be limiting unless specifically claimed.

EXAMPLES

The following Example 1 was made via sputtering on 6 mm thick clear glass substrates so as to have approximately the layer stack set forth below. Example 1 is according to example embodiments of this invention as shown in FIG. 1, whereas the modeled Comparative Example (CE) has no NiCr absorbing layer 4 and is provided for purposes of comparison. Example 1 had approximately the following layer stack, where the thicknesses are in units of angstroms (Å).

| Layer<br>Glass (6 mm thick) | Thickness (Å) |
|---|---|
| $Si_xN_y$ (layer 3) | 124 Å |
| NiCr (layer 4) | 25 Å |
| $Si_xN_y$ (layer 5) | 200 Å |
| $ZnO_x$ (layer 7) | 110 Å |
| Ag (layer 9) | 119 Å |
| $NiCrO_x$ (layer 11) | 30 Å |
| $SnO_2$ (layer 13) | 442 Å |
| $Si_xN_y$ (layer 14) | 125 Å |
| $SnO_2$ (layer 15) | 100 Å |
| $ZnO_x$ (layer 17) | 100 Å |
| Ag (layer 19) | 155 Å |
| $NiCrO_x$ (layer 21) | 30 Å |
| $SnO_2$ (layer 23) | 70 Å |
| $Si_3N_4$ (layer 25) | 302 Å |

The Comparative Example (CE) was essentially the same as Examples 1 and 2, except that absorbing layer 4 was not present in the CE. Example 1 was heat treated for tempering, and had the following characteristics measured monolithically.

| Characteristic | Ex. 1 (HT) |
|---|---|
| $T_{vis}$ (or TY)(Ill. C. 2°): | 59% |
| $a^*_t$ (Ill. C. 2°): | −4.47 |
| $b^*_t$ (Ill. C. 2°): | 0.58 |
| $R_fY$ (Ill. C., 2 deg.): | 11.63% |
| $a^*_f$ (Ill. C., 2°): | −10.59 |
| $b^*_f$ (Ill. C., 2°): | −1.58 |
| $R_gY$ (Ill. C., 2 deg.): | 12.62% |
| $a^*_g$ (Ill. C., 2°): | −0.79 |
| $b^*_g$ (Ill. C., 2°): | −2.81 |
| Rga* (45°): | −1.50 |
| Rgb* (45°): | −2.92 |
| $R_s$ (ohms/square): | 1.29 |

The Comparative Example (CE) was essentially the same as Example 1, but did not have the NiCr layer 4. In contrast to the Rga* (45°) value of −1.50 of Example 1, the CE had a Rga* (45°) value of +5 which is very reddish. Thus, it will be appreciated that the NiCr layer 4 of Example 1 at the approximate 25 angstrom thickness caused the coated article to have much better color at the 45 degree viewing angle than the CE with no NiCr layer 4.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

The invention claimed is:

1. A coated article including a coating supported by a glass substrate, the coating comprising:
    first and second infrared (IR) reflecting layers comprising silver, wherein said IR reflecting layers are spaced apart from one another by at least one dielectric layer that is located therebetween, and wherein the first IR reflecting layer is located closer to the substrate than is the second IR reflecting layer;
    a substantially metallic absorption layer consisting essentially of NiCr located such that both of the first and second IR reflecting layers are located over the absorption layer, wherein the absorption layer is sandwiched between and contacting first and second layers comprising silicon nitride; and
    wherein the substantially metallic absorption layer is from about 20-30 angstroms (Å) thick and the coated article has a glass side reflective a* color value of from about +1 to −1.5 at a 45 degree viewing angle from normal.

2. The coated article of claim 1, wherein said first layer comprising silicon nitride is located between the glass substrate and the absorption layer, and wherein a layer comprising zinc oxide is located between and contacting the second layer comprising silicon nitride and the first IR reflecting layer comprising silver.

3. The coated article of claim 1, wherein said first and second IR reflecting layers are spaced apart by at least: a layer comprising tin oxide, a layer comprising silicon nitride and a layer comprising zinc oxide.

4. The coated article of claim 1, wherein the substantially metallic absorption layer is about 25 angstroms (Å) thick.

5. The coated article of claim 1, wherein the coated article has a negative glass side reflective a* color value at a 45 degree viewing angle from normal.

6. The coated article of claim 1, wherein the coated article has a glass side reflective a* color value of from about 0 to −1.0 at a 45 degree viewing angle from normal.

7. The coated article of claim 1, wherein said coated article has a visible transmission of from about 30-65%, measured monolithically.

8. The coated article of claim 1, wherein said coated article is an IG window unit having a visible transmission of from about 15-65% and has an SHGC of no greater than 0.30.

9. The coated article of claim 1, wherein said absorption layer consists of NiCr.

10. The coated article of claim 1, wherein the coated article is heat treated.

11. A coated article including a coating supported by a glass substrate, the coating comprising:
    first and second infrared (IR) reflecting layers comprising silver, wherein said IR reflecting layers are spaced apart from one another by at least one dielectric layer that is located therebetween, and wherein the first IR reflecting layer is located closer to the substrate than is the second IR reflecting layer;
    a substantially metallic absorption layer located such that both of the first and second IR reflecting layers are located over the absorption layer, wherein the absorption layer is sandwiched between and contacting first and second nitride inclusive layers; and
    wherein the substantially metallic absorption layer is from about 20-30 angstroms (Å) thick.

12. The coated article of claim 11, wherein said first layer comprising silicon nitride is located between the glass substrate and the absorption layer, and wherein a layer comprising zinc oxide is located between and contacting the second layer comprising silicon nitride and the first IR reflecting layer comprising silver.

13. The coated article of claim 11, wherein said first and second IR reflecting layers are spaced apart by at least: a layer comprising tin oxide, a layer comprising silicon nitride and a layer comprising zinc oxide.

14. The coated article of claim 11, wherein the substantially metallic absorption layer is about 25 angstroms (Å) thick.

15. The coated article of claim 11, wherein the coated article has a negative glass side reflective a* color value at a 45 degree viewing angle from normal.

16. The coated article of claim 11, wherein the coated article has a glass side reflective a* color value of from about 0 to −1.0 at a 45 degree viewing angle from normal.

17. The coated article of claim 11, wherein said coated article has a visible transmission of from 30-65%, measured monolithically.

18. The coated article of claim 11, wherein said coated article is an IG window unit having a visible transmission of from 15-60% and has an SHGC of no greater than 0.30.

19. The coated article of claim 11, wherein said absorption layer consists of NiCr.

20. The coated article of claim 11, wherein the coated article is heat treated.

21. A coated article including a coating supported by a glass substrate, the coating comprising:
    first and second infrared (IR) reflecting layers comprising silver, wherein said IR reflecting layers are spaced apart from one another by at least one dielectric layer that is located therebetween, and wherein the first IR reflecting layer is located closer to the substrate than is the second IR reflecting layer;
    a substantially metallic absorption layer located such that both of the first and second IR reflecting layers are located over the absorption layer, wherein the absorption layer is sandwiched between and contacting first and second nitride inclusive layers; and
    wherein the coated article has a glass side reflective a* color value of from about +1 to −1.5 at a 45 degree viewing angle from normal.

22. A coated article including a coating supported by a glass substrate, the coating comprising:
    first and second infrared (IR) reflecting layers comprising silver, wherein said IR reflecting layers are spaced apart from one another by at least one dielectric layer that is located therebetween, and wherein the first IR reflecting layer is located closer to the substrate than is the second IR reflecting layer;
    an absorption layer located such that both of the first and second IR reflecting layers are located over the absorption layer, wherein the absorption layer is sandwiched between and contacting first and second nitride inclusive layers; and
    wherein the coated article is characterized by one or both of: (a) the absorption layer is from about 20-30 angstroms (Å) thick, and/or (b) the coated article has a glass side reflective a* color value of from about +1 to −1.5 at a 45 degree viewing angle from normal.

* * * * *